US008670443B2

(12) United States Patent
Kurokawa et al.

(10) Patent No.: US 8,670,443 B2
(45) Date of Patent: Mar. 11, 2014

(54) COMMUNICATION SYSTEM, FEMTO-CELL BASE STATION, AND COMMUNICATION METHOD

(75) Inventors: Osamu Kurokawa, Tokyo (JP); Yuki Nakanishi, Tokyo (JP); Yoshio Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 255 days.

(21) Appl. No.: 13/124,680

(22) PCT Filed: Dec. 24, 2009

(86) PCT No.: PCT/JP2009/071396
§ 371 (c)(1),
(2), (4) Date: Apr. 18, 2011

(87) PCT Pub. No.: WO2010/074124
PCT Pub. Date: Jul. 1, 2010

(65) Prior Publication Data
US 2012/0002649 A1    Jan. 5, 2012

(30) Foreign Application Priority Data
Dec. 26, 2008   (JP) ................... 2008-333673

(51) Int. Cl.
*H04L 12/66* (2006.01)
*H04L 12/28* (2006.01)
(52) U.S. Cl.
USPC .......................................... 370/352; 370/401
(58) Field of Classification Search
None
See application file for complete search history.

(56) References Cited

U.S. PATENT DOCUMENTS

| 8,340,626 | B2 * | 12/2012 | Edge ........................ 455/404.1 |
| 2007/0014281 | A1 * | 1/2007 | Kant .............................. 370/352 |
| 2007/0121596 | A1 * | 5/2007 | Kurapati et al. ............... 370/356 |
| 2007/0238466 | A1 * | 10/2007 | Buckley et al. ............... 455/445 |
| 2007/0238467 | A1 * | 10/2007 | Buckley et al. ............... 455/445 |
| 2008/0198841 | A1 * | 8/2008 | Desorbay et al. ............. 370/352 |
| 2008/0291905 | A1 * | 11/2008 | Chakravadhanula et al. 370/355 |

(Continued)

FOREIGN PATENT DOCUMENTS

| CA | 2350012 A1 | 2/2002 |
| CN | 101026534 A | 8/2007 |

(Continued)

OTHER PUBLICATIONS

B. Yamauchi et al., "Home U Service no System Kaihatsu", NTT DoCoMo Technical Journal, vol. 16, No. 3, Oct. 1, 2008, pp. 6-12.

(Continued)

*Primary Examiner* — Eunsook Choi
(74) *Attorney, Agent, or Firm* — Sughrue Mion, PLLC (57) ABSTRACT

A femto-cell base station acquires an IP address of a CS-dedicated relay device from a first management device, connects to the CS-dedicated relay device based on the acquired IP address of the CS-dedicated relay device, and establishes a first IPsec Tunnel between the femto-cell base station and the CS-dedicated relay device. The femto-cell base station also acquires an IP address of a PS-dedicated relay device from a second management device through the first IPsec Tunnel, connects to the PS-dedicated relay device based on the acquired IP address of the PS-dedicated relay device, and establishes a second IPsec Tunnel between the femto-cell base station and the PS-dedicated relay device.

14 Claims, 5 Drawing Sheets

(56) References Cited

U.S. PATENT DOCUMENTS

| | | | |
|---|---|---|---|
| 2009/0135795 A1* | 5/2009 | Lim et al. | 370/338 |
| 2009/0156213 A1* | 6/2009 | Spinelli et al. | 455/436 |
| 2010/0054187 A1* | 3/2010 | Hallenstal et al. | 370/328 |
| 2010/0075651 A1* | 3/2010 | Hallenstal et al. | 455/418 |
| 2011/0200022 A1* | 8/2011 | Annamalai | 370/338 |

FOREIGN PATENT DOCUMENTS

| | | |
|---|---|---|
| JP | 2008054102 A | 3/2008 |
| JP | 2008219436 A | 9/2008 |
| JP | 2008228250 A | 9/2008 |

OTHER PUBLICATIONS

S. Fujino et al., "Development of 3G-Wireless LAN Gateway", Proceedings of the 2004 IEICE Communications Society Conference, B-6-26, Sep. 2004.

3GPP, "3rd Generation Partnership Project; Technical Specification Group Core Network and Terminals; Mobile radio interface Layer 3 specification; Core network protocols; Stage 3 (Release 8)", TS 24.008, V8.2.0, 3rd Generation Partnership Project, Jun. 2008, pp. 30-60. Cited in CN Office Action.

3GPP, "3rd Generation Partnership Project; Technical Specification Group Services and System Aspects; 3G Security; Security architecture (Release 8)", TS 33.102, V8.0.0, 3rd Generation Partnership Project, Jun. 2008, pp. 20-35. Cited in CN Office Action.

Chinese Office Action for CN 200980144256.7 dated on Apr. 11, 2013 with Partial English Translation.

3GPP, "3rd Generation Partnership Project; Technical Specification Group Service and System Aspects; 3G Security; Wireless Local Area Network (WLAN) interworking security (Release 8)", TS 33.234, V8.0.0, Dec. 2007.

International Search Report of PCT Application No. PCT/JP2009/071396 mailed Feb. 16, 2010.

\* cited by examiner

Fig.3

COMMUNICATION SYSTEM, FEMTO-CELL BASE STATION, AND COMMUNICATION METHOD

This application is the National Phase of PCT/JP2009/071396, filed Dec. 24, 2009, which claims the priority under Japanese Patent Application No. 2008-333673, filed Dec. 26, 2008, the disclosure of which is incorporated herein by reference in its entirety.

TECHNICAL FIELD

The present invention relates to technologies for making communications through femto-cell base stations.

BACKGROUND ART

In recent years, a communication system which introduces femto-cell base stations has been developed more and more in order to improve the quality of communication area.

The femto-cell base station is a small radio base station which covers a narrow communication area defined by a radius of approximately several tens of meters, and is installed indoors within a home or an office with the intention to cover an indoor communication area. In this way, communication quality can be improved in communication areas which cannot be covered by existing micro-cell base stations. In addition, communication areas can be covered without incurring costs for the upgrading of infrastructure for micro-cell base stations.

In this regard, a communication system which introduces femto-cell base stations uses CS-dedicated PDG (Packet Data Gateway) which is a relay device for CS (Circuit Switching) services, and PS-dedicated PDG which is a relay device for PS (Packet Switching) services independently of each other.

Figure 1:
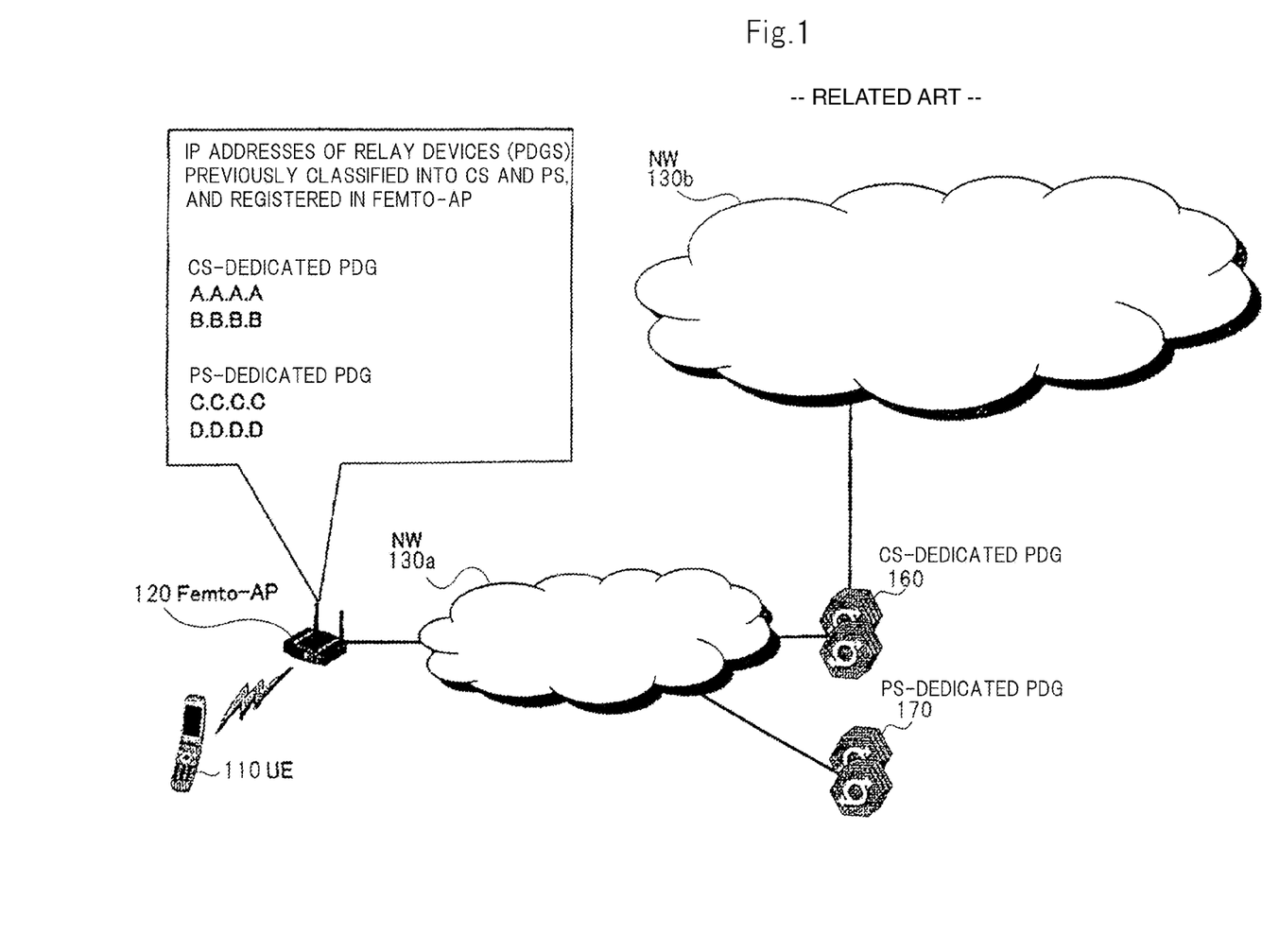
FIG. 1 A diagram showing an exemplary communication system which introduces a femto-cell base station related to the present invention.

FIG. 1 is a diagram showing an exemplary communication system which introduces a femto-cell base station related to the present invention.

In the communication system which introduces the femto-cell base station, a method has been contemplated to classify IP addresses of relay devices (PDG) connectable to networks 130a, 130b into CS-dedicated PDG 160 for CS services and PS-dedicated PDG 170 for PS services, and separately register these IP addresses in femto-cell base station (Femto AP) 120, as shown in FIG. 1. In the scenario shown in FIG. 1, "AAAA, BBBB" has been registered as the IP address of CS-dedicated PDG 160, while "CCCC, DDDD" has been registered as the IP address of PS-dedicated PDG 170.

Then, femto-cell base station (Femto AP) 120 connects to CS-dedicated PDG 160 based on the IP address "AAAA, BBBB" of CS-dedicated PDG 160 to provide CS services, or connects to PS-dedicated PDG 170 based on the IP address "CCCC, DDDD" of PS-dedicated PDG 170 to provide PS services.

However, in the communication system shown in FIG. 1, since the IP addresses of relay devices (PDG) must be registered in femto-cell base station (Femto AP) 120, the system will bear a larger load for IP address registration processing since a larger number of femto-cell base stations (Femto AP) 120 are installed in the system. Also, in the communication system shown in FIG. 1, when the IP address of a relay device (PDG) is changed, the IP address registered in femto-cell base station (Femto AP) 120 must be changed as well.

Because of these inconveniences as mentioned above, a need exists for the development of a system which is capable of separately using IP addresses for CS-dedicated and PS-dedicated relay devices (PDG) in a simple way.

For reference, as a technical document which has been filed prior to the present application, there is a document which discloses a technology that enables a public mobile terminal to utilize both public mobile communication services and internal services, while protecting SIP messages with IPScc (JP2008-228250A (hereinafter called "Patent Document 1")).

There is also a document which discloses a technology related to standardization of 3PPP (3GPP TS 33.234 V8.0.0 (2007-12) (hereinafter called "Non-Patent Document 1")).

SUMMARY OF THE INVENTION

Problem to be Solved by the Invention

Patent Document 1 discloses that a DNS server is provided to notify the IP address of In-CSCF1 in response to queries for a P-CSCF address from two terminals.

Figure 2:
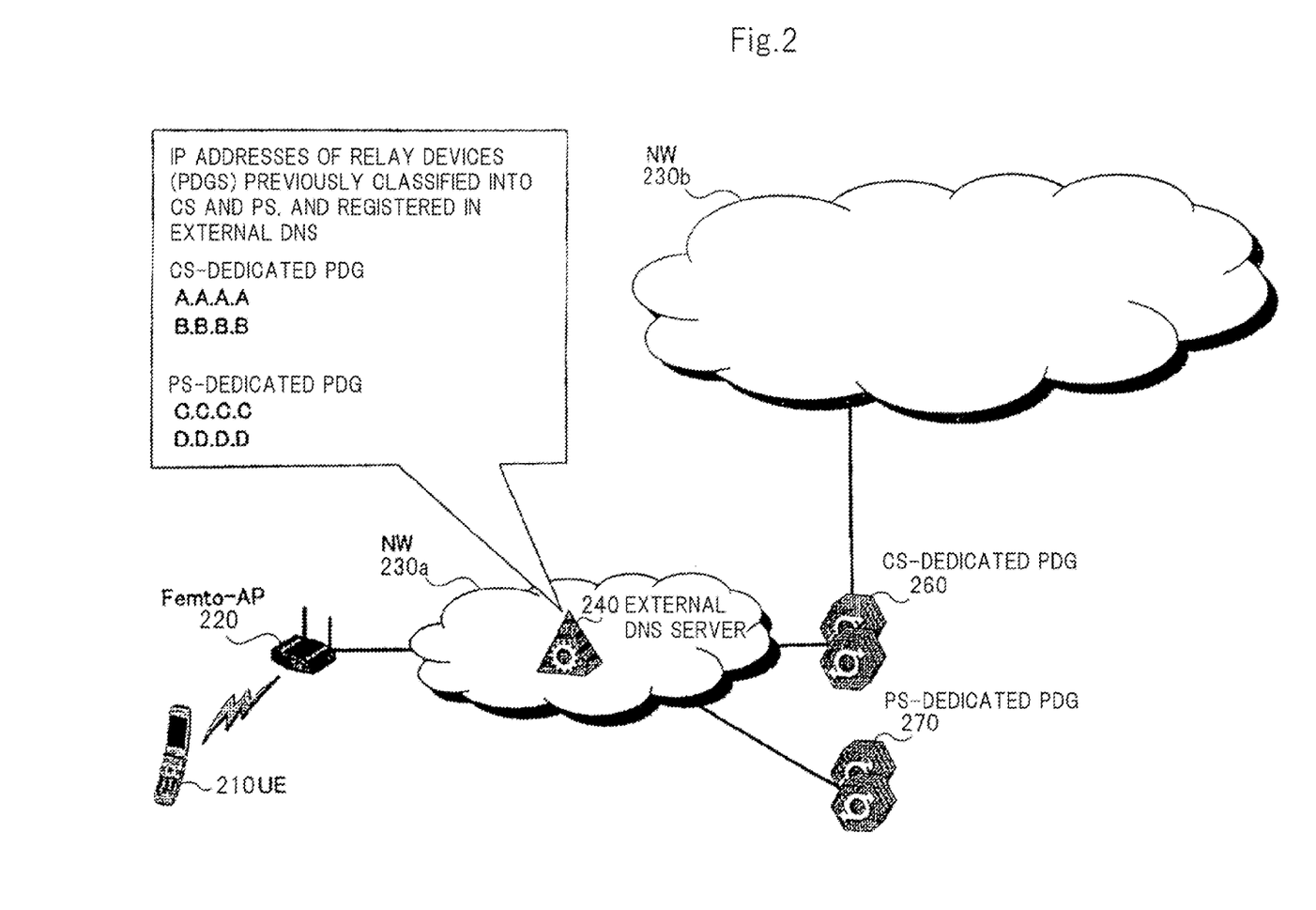
FIG. 2 A diagram showing an exemplary communication system, related to the present invention, which applies the technology disclosed in Patent Document 1.

FIG. 2 is a diagram showing an exemplary communication system, related to the present invention, which applies the technology disclosed in Patent Document 1.

When the technology of Patent Document 1 is applied, and external DNS Server 240 is provided in network 230a to which femto-cell base station (Femto AP) 220 can be connected, a system can be constructed to notify the IP address of a pertinent relay device (PDG) in response to a query for the IP address from femto-cell base station (Femto AP) 220. External DNS Server 240 is a management device for managing IP addresses.

In the communication system shown in FIG. 2, IP addresses of relay devices (PDG) are classified into IP address "AAAA, BBBB" of CS-dedicated PDG 260 and IP address "CCCC, DDDD" of PS-dedicated PDG 270, and registered in external DNS Server 240. Then, femto-cell base station (Femto AP) 220 acquires IP address "AAAA, BBBB" of CS-dedicated PDG 260 from external DNS Server 240, and connects it to CS-dedicated PDG 260 based on the acquired IP address "AAAA, BBBB" of CS-dedicated PDG 260 to provide CS services. Also, femto-cell bases station (Femto AP) 220 acquires IP address "CCCC, DDDD" of PS-dedicated PDG 270 from external DNS Server 240, and connects it to PS-dedicated PDG 270 based on the acquired IP address "CCCC, DDDD" of PS-dedicated PDG 270 to provide PS services.

However, in the communication system shown in FIG. 2, since femto-cell base station (Femto AP) 220 acquires the IP address of a relay device (PDG) from external DNS Server 240, the IP address of the relay device (PDG) cannot be acquired while the security is ensured. For this reason, a method is required for enabling the femto-cell base station to acquire the IP address of a relay device (PDG) while security is ensured, but it is difficult to construct the system so as to ensure security when the IP address of CS-dedicated PDG 260 is acquired. Accordingly, under the present circumstances, it is desired to construct the system such that security can be ensured only when the IP address of PS-dedicated PDG 270 is acquired.

The present invention has been made in view of the circumstance described above, and it is an object of the invention to provide a communication system, a femto-cell base station, and a communication method, which are capable of enabling a femto-cell base station to acquire an IP address of a PS-dedicated relay device while security is ensured.

Means for Solving the Problems

To achieve the above object, the present invention comprises the following features.

<Communication System>

A communication system according to the present invention is a communication system comprising:

a femto-cell base station for defining a predetermined communication area, a relay device for receiving a message transmitted from the femto-cell base station, and a management device for managing an IP address of the relay device, wherein:

the relay device comprises a CS (Circuit Switching)-dedicated relay device used for CS services and a PS (Packet Switching)-dedicated relay device used for PS services, the management device comprises a first management device for managing an IP address of the CS-dedicated relay device, and a second management device for managing an IP address of the PS-dedicated relay device, and the femto-cell base station comprises:

first establishing means for acquiring the IP address of the CS-dedicated relay device from the first management device, connecting to the CS-dedicated relay device based on the acquired IP address of the CS-dedicated relay device, and establishing a first IPsec Tunnel between the femto-cell base station and the CS-dedicated relay device; and second establishing means for acquiring the IP address of the PS-dedicated relay device from the second management device, connecting to the PS-dedicated relay device based on the acquired IP address of the PS-dedicated relay device, and establishing a second IPSec Tunnel between the femto-cell base station and the PS-dedicated relay device.

<Femto-Cell Base Station>

Also, a femto-cell base station according to the present invention is a femto-cell base station for defining a predetermined communication area, comprising:

first establishing means for acquiring an IP address of a CS (Circuit Switching) dedicated relay device used for CS services from a first management device, connecting to the CS-dedicated relay device based on the acquired IP address of the CS-dedicated relay device, and establishing a first IPSec Tunnel between the femto-cell base station and the CS-dedicated relay device; and second establishing means for acquiring an IP address of a PS (Packet Switching) dedicated relay device used for PS services from a second management device through the first IPsec Tunnel, connecting to the PS-dedicated relay device based on the acquired IP address of the PS-dedicated relay device, and establishing a second IPSec Tunnel between the femto-cell base station and the PS-dedicated relay device.

<Communication Method>

Also, a communication method according to the present invention is performed in a communication system comprising a femto-cell base station for defining a predetermined communication area, a relay device for receiving a message transmitted from the femto-cell base station, and a management device for managing an IP address of the relay device, wherein the relay device comprises a CS (Circuit Switching)-dedicated relay device used for CS services and a PS (Packet Switching)-dedicated relay device used for PS services, and the management device comprises a first management device for managing an IP address of the CS-dedicated relay device, and a second management device for managing an IP address of the PS-dedicated relay device. The communication method comprises:

a first establishing step of the femto-cell base station acquiring the IP address of the CS-dedicated relay device from the first management device, connecting to the CS-dedicated relay device based on the acquired IP address of the CS-dedicated relay device, and establishing a first IPsec Tunnel between the femto-cell base station and the CS-dedicated relay device; and a second establishing step of the femto-cell base station acquiring the IP address of the PS-dedicated relay device from the second management device through the first IPsec Tunnel, connecting to the PS-dedicated relay device based on the acquired IP address of the PS-dedicated relay device, and establishing a second IPSec Tunnel between the femto-cell base station and the PS-dedicated relay device.

Also, a communication method according to the present invention is performed by a femto-cell base station for defining a predetermined communication area. The communication method comprises:

a first establishing step of acquiring an IP address of a CS (Circuit Switching) dedicated relay device used for CS services from a first management device, connecting to the CS-dedicated relay device based on the acquired IP address of the CS-dedicated relay device, and establishing a first IPSec Tunnel between the femto-cell base station and the CS-dedicated relay device; and a second establishing step of acquiring an IP address of a PS (Packet Switching) dedicated relay device used for PS services from a second management device through the first IPsec Tunnel, connecting to the PS-dedicated relay device based on the acquired IP address of the PS-dedicated relay device, and establishing a second IPSec Tunnel between the femto-cell base station and the PS-dedicated relay device.

<Communication Program>

Also, a communication program according to the present invention is provided for execution by a femto-cell base station for defining a predetermined communication area to execute, wherein:

the communication program causes the femto-cell base station to execute:

a first establishing procedure for acquiring an IP address of a CS (Circuit Switching) dedicated relay device used for CS services from a first management device, connecting to the CS-dedicated relay device based on the acquired IP address of the CS-dedicated relay device, and establishing a first IPSec Tunnel between the femto-cell base station and the CS-dedicated relay device; and a second establishing procedure for acquiring an IP address of a PS (Packet Switching) dedicated relay device used for PS services from a second management device through the first IPsec Tunnel, connecting to the PS-dedicated relay device based on the acquired IP address of the PS-dedicated relay device, and establishing a second IPSec Tunnel between the femto-cell base station and the PS-dedicated relay device.

Effects of the Invention

According to the present invention, the femto-cell base station can acquire the IP address of the PS-dedicated relay device while security is ensured.

MODES FOR CARRYING OUT THE INVENTION

Figure 3:
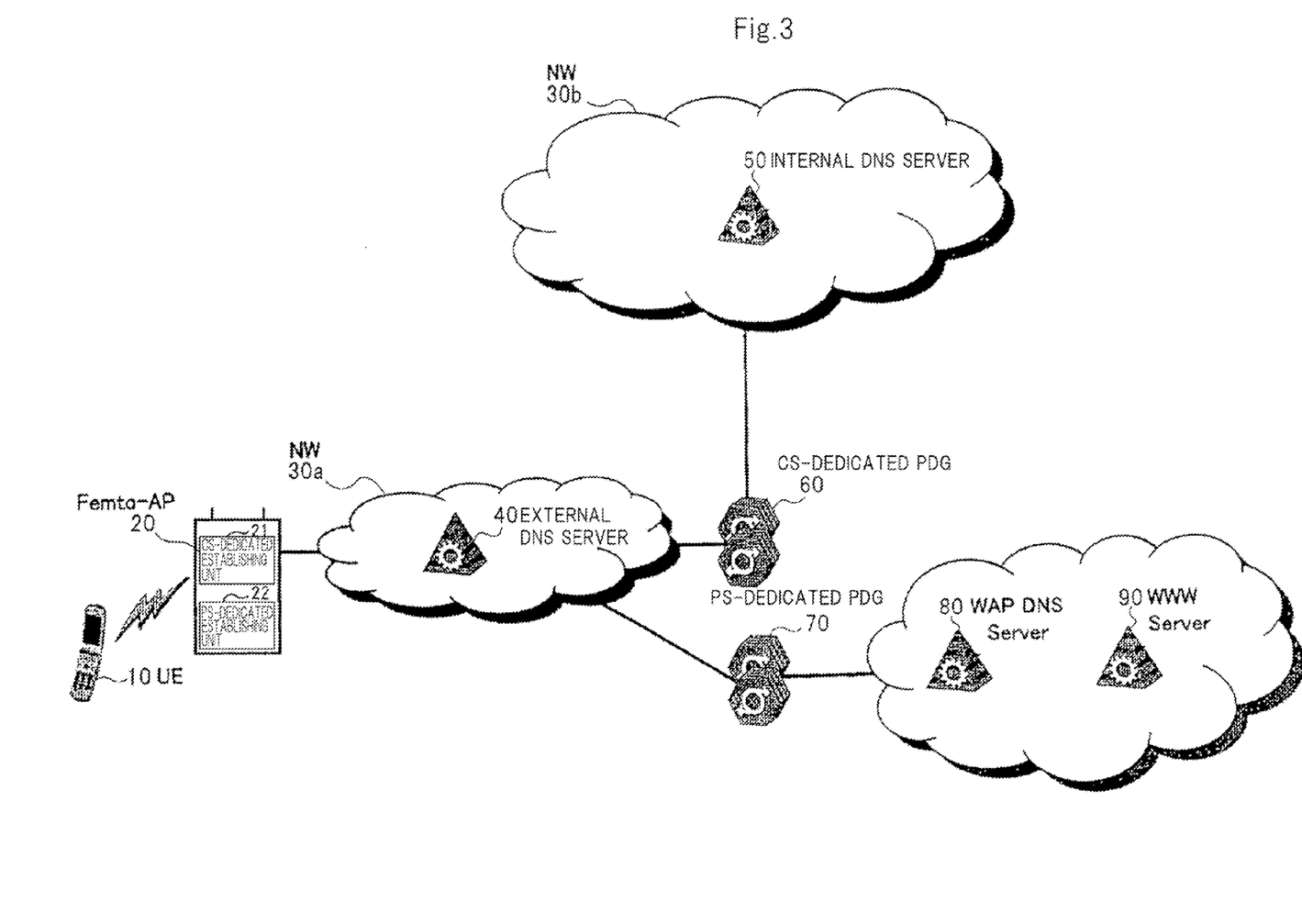
FIG. 3 A diagram showing an embodiment of a communication system according to the present invention.

FIG. 3 is a diagram showing an embodiment of a communication system according to the present invention.
<Outline of Communication System>

Referring first to FIG. 3, a description will be given of an outline of the embodiment of the communication system according to the present invention.

As shown in FIG. 3, the communication system in this embodiment comprises femto-cell base station (Femto AP) 20 for defining a predetermined communication area; CS-dedicated relay device (CS-dedicated PDG) 60 and PS-dedicated relay device (PS-dedicated PDG) 70 which serve as relay devices (PDG: Packet Data Gateway) for receiving messages transmitted from femto-cell base station (Femto AP) 20; and external DNS Server 40 and internal DNS Server 50 which are management devices (DNS servers: Domain Name System servers) for managing IP addresses of these relay devices.

Specifically, CS-dedicated relay device (CS-dedicated PDG) 60 is used for CS (Circuit Switching) services, while PS-dedicated relay device (PS-dedicated PDG) 70 is used for PS (Packet Switching) services. External DNS Server 40 in turn serves as a first management device for managing the IP address of CS-dedicated relay device (CS-dedicated PDG) 60, while internal DNS Server 50 serves as a second management device for managing the IP address of PS-dedicated relay device (PS-dedicated PDG) 70. Then, femto-cell base station (Femto AP) 20 comprises CS-dedicated establishing unit 21 which is first establishing means for acquiring the IP address of CS-dedicated relay device (CS-dedicated PDG) 60 from external DNS Server 40, and for connecting to CS-dedicated relay device (CS-dedicated PDG) 60 based on the acquired IP address of CS-dedicated relay device (CS-dedicated PDG) 60 to establish a first IPSec Tunnel between femto-cell base station 20 and CS-dedicated relay device (CS-dedicated PDG) 60; and PS-dedicated establishing unit 22 which is second establishing means for retrieving the IP address of PS-dedicated relay device (PS-dedicated PDG) 70 from internal DNS Server 50 through the first IPSec Tunnel, and for connecting to PS-dedicated relay device (PS-dedicated PDG) 70 based on the acquired IP address of PS-dedicated relay device (PS-dedicated PDG) 70 to establish a second IPSec Tunnel between femto-cell base station 20 and PS-dedicated relay device (PS-dedicated PDG) 70. In this way, femto-cell base station 20 can acquire the IP address of PS-dedicated relay device (PS-dedicated PDG) 70 while security is ensured. In the following, the communication system of this embodiment will be described in detail with reference to the accompanying drawings.

First Embodiment

<System Configuration of Communication System>

Referring first to FIG. 3, a description will be given of an exemplary system configuration of the communication system of this embodiment.

As shown in FIG. 3, the communication system of this embodiment comprises UE (user equipment) 10; Femto AP 20 which serves as an access point for UE 10; CS-dedicated PDG 60; PS-dedicated PDG 60; external DNS Server 40; internal DNS Server 50; WAP (Wireless Application Protocol) DNS Server 80 which is a third management device; and WWW Server 90.

UE 10 is a communication terminal device such as a portable telephone.

Femto AP 20 is a small radio base station which covers a narrow communication area having a radius in the order of several tens of meters.

PDG refers to a device for relaying a message, and the communication system of this embodiment comprises CS-dedicated PDG 60 and PS-dedicated PDG 70. CS-dedicated PDG 60 is a relay device used for CS services, while PS-dedicated PDG 70 is a relay device used for PS services.

The DNS server is a device for managing domain names and IP addresses in a corresponding manner. The communication system of this embodiment comprises external DNS Server 40 for managing the IP address of CS-dedicated PDG 60; internal DNS Server 50 for managing the IP address of PS-dedicated PDG 70; and WAP DNS Server 90 for managing the IP address of WWW Server 90.

WWW Server 90 is a device for providing a variety of services to users.
<Processing Operations of Communication System>

In the following, processing operations of the communication system in this embodiment will be described in detail.

Figure 4:
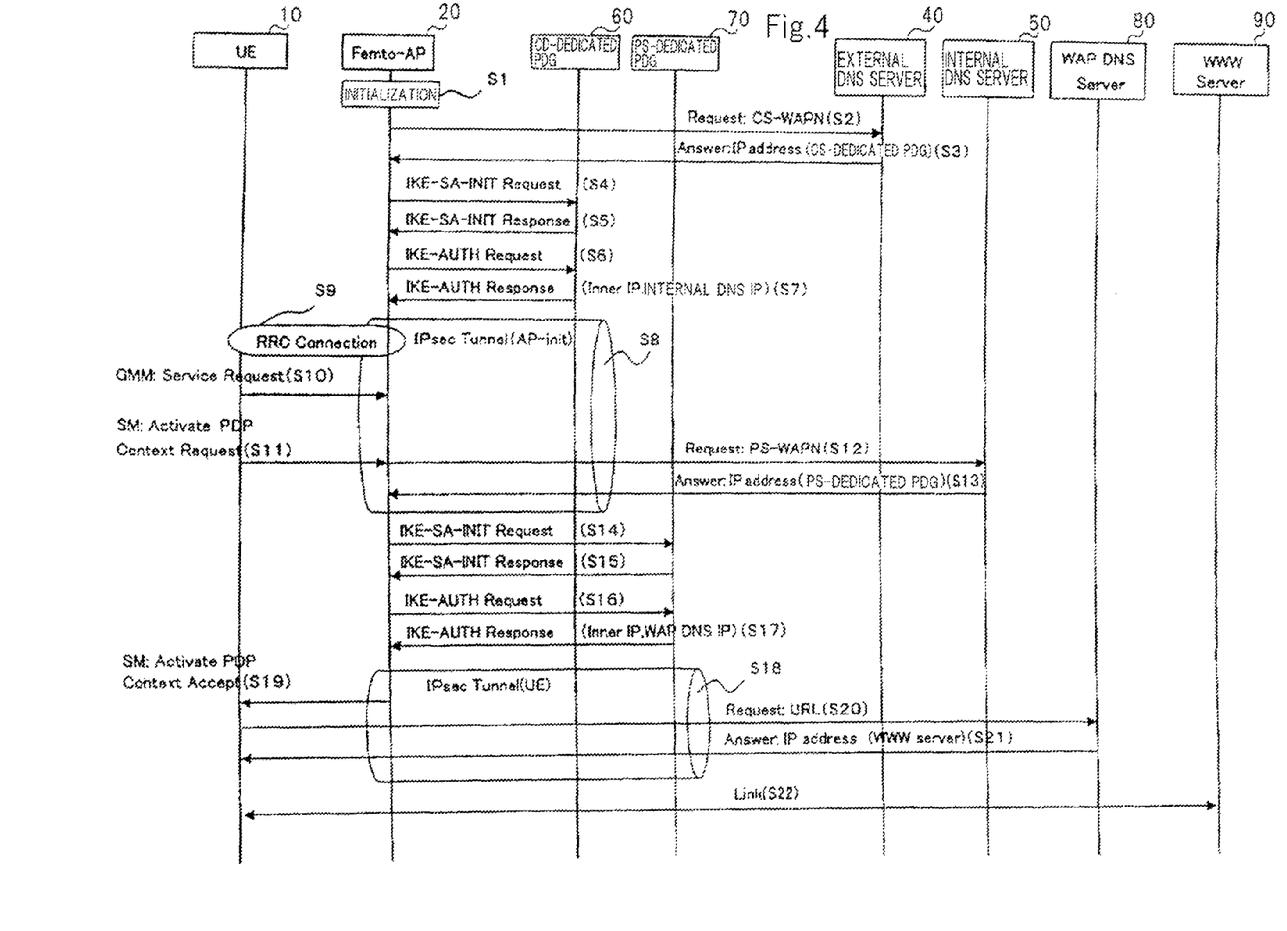
FIG. 4 A diagram for describing a first embodiment of the processing operation of the communication system shown in FIG. 3.

FIG. 4 is a diagram for describing a first embodiment of the processing operation of the communication system shown in FIG. 3.

First, Femto AP 20 performs initialization (step S1), and transmits a Request (CS-WAPN) to external DNS Server 40 for querying the IP address of CS-dedicated PDG 60 (step S2). For reference, WAPN stands for Wireless Access Point Name, which is information for identifying a link point of a network.

Upon receipt of the Request transmitted from Femto AP 20, external DNS Server 40 acquires the IP address of CS-dedicated PDG 60 corresponding to the received CS-WAPN, and transmits an Answer including the IP address of CS-dedicated PDG 60 to Femto AP 20 (step S3).

Upon receipt of the Answer transmitted from external DNS Server 40, Femto AP 20 transmits an IKE_SA-INIT Request, which stands for Internet Key Exchange-Security Authentication-INITialise to CS-dedicated PDG 60, based on the IP address of CS-dedicated PDG included in the Answer in CS-dedicated establishing unit 21 (step S4).

Upon receipt of the IKE_SA-INIT Request transmitted from Femto AP 20, CS-dedicated PDG 60 transmits an IKE_SA-INIT Response to Femto AP 20 (step S5).

Upon receipt of the IKE_SA-INIT Response transmitted from CS-dedicated PDG 60, Femto AP 20 transmits an IKE_AUTH Request, which stands for Internet Key Exchange-AUTHentication, to CS-dedicated PDG in CS-dedicated establishing unit 21 (step S6).

Upon receipt of the IKE_AUTH Request transmitted from Femto AP 20, CS-dedicated PDG 60 transmits an IKE_AUTH Response to Femto AP 20 (step S7). Specifically, this IKE_AUTH Response includes an inner IP address (Inner IP) which is an IP address for use on an application layer (SIP communication) assigned to Femto AP 20, and the IP address of internal DNS Server 50 (internal DNS IP). Next, CS-dedicated PDG 60 establishes an IPSec Tunnel between CS-dedicated PDG 60 and Femto AP 20 (step S8). In this regard, the IPSec Tunnel is established by a method conforming to 3GPP. In this way, Femto AP 20 accesses CS-PDG 60 based on the IP address of CS-dedicated PDG 60 acquired from external DNS Server 40, and establishes a first IPSec Tunnel between Femto AP 20 and CS-dedicated PDG 60 in CS-dedicated establishing unit 21.

Next, UE 10 makes an RRC Connection (step S9), and transmits a GMM:Service Request to Femto AP 20 (step S10). In this, regard, RRC stands for Radio Resource Control which is a protocol for controlling a radio line between a mobile terminal and a radio access network. Also, GMM stands for GPRS Mobility Management which is a protocol for conducting mobility management such as location registration, authentication and the like in a packet exchange domain.

Subsequently, UE 10 transmits an SM:Activate PDP Context Request to Femto AP 20 (step S11). In this regard, SM stands for Session Management which is a protocol for controlling calls such as origination and termination in packet communications.

Upon receipt of the SM:Activate PDP Context Request transmitted from UE 10, Femto AP 20 transmits a Request (PS-WAPN) to internal DNS Server 50 for querying the IP address of PS-dedicated PDG 70 in PS-dedicated establishing unit 22 (step S12). Specifically, Femto AP 20 transmits the Request (PS-WAPN) to internal DNS Server 50 through the IPSec Tunnel established at step S8. In this way, femto AP 20 can transmit concealed PS-WAPN to internal DNS Server 50.

Upon receipt of the Request transmitted from Femto AP 20, internal DNS Server 50 acquires the IP address of PS-dedicated. PDG 70 corresponding to that PS-WAPN, and transmits an Answer including the IP address of PS-dedicated PDG 70 to Femto AP 20 (step S13). Specifically, internal DNS Server 50 transmits the Answer to Femto AP 20 through the IPSec Tunnel established at step S8. In this way, internal DNS Server 50 can transmit the concealed IP address of PS-dedicated PDG 70 to Femto AP 20.

Upon receipt of the Answer transmitted from internal DNS Server 50, Femto AP 20 transmits an IKE_SA-INIT Request to PS-dedicated PDG 70 based on the IP address of the PS-dedicated PDG included in the Answer (step S14).

Upon receipt of the IKE_SA Request transmitted from Femto AP 20, PS-dedicated PDG 70 transmits an IKE_SA-INIT Response to Femto AP 20 (step S15).

Upon receipt of the IKE_SA-INIT Response from PS-dedicated PDG 70, Femto AP 20 transmits an IKE_AUTH Request to PS-dedicated PDG 70 in PS-dedicated establishing unit 22 (step 16).

Upon receipt of the IKE_AUTH Request transmitted from Femto AP 20, PS-dedicated PDG 70 transmits an IKE_AUTH Response to Femto AP 20 (step S17), where the IKE_AUTH Response includes an Inner IP address (Inner IP) which is an IP address used on an application layer (SIP communication) assigned to Femto AP 20, and the IP address of WAP DNS Server 80 (WAP DNS IP).

Next, PS-dedicated PDG 70 establishes an IPSec Tunnel between PS-dedicated PDG 70 and Femto AP 20 (step S18), and transmits SM:Activate PDP Context Accept to UE 10 (step S19). In this way, Femto AP 20 acquires the IP address of PS-dedicated PDG 70 from internal DNS Server 50 through the IPSec Tunnel established at step S8, accesses PS-dedicated PDG 70 based on the acquired IP address of PS-dedicated PDG 70, and establishes a second IPSec Tunnel between Femto AP 20 and PS-dedicated PDG 70.

Upon receipt of the SM:Activate PDP Context Accept transmitted from PS-dedicated PDG 70, UE 10 transmits a Request (URL) to WAP DNS Server 80 for querying the IP address of WWW Server 90 (step S20). Specifically, the Request (URL) is transmitted to WAP DNS Server 80 through the IPSec Tunnel established at step S18. In this way, UE 10 can transmit the concealed URL to WAP DNS Server 80.

Upon receipt of the Request transmitted from UE 10, WAP DNS Server 80 acquires the IP address of WWW Server 90 corresponding to the received URL, and transmits an Answer including the IP address of WWW Server 90 to UE 10 (step S21). Notably, since the IP address of WWW Server 90 is transmitted to UE 10 through the IPSec Tunnel established at step S18, WAP DNS Server 80 can transmit the concealed IP address of WWW Server 90 to the UE.

Upon receipt of the Answer transmitted from WAP DNS Server 80, UE 10 accesses WWW Server 90 based on the IP address of WWW Server 90 included in the Answer, and links to WWW Server 90 (step S22) to utilize a variety of services provided by WWW Server 90.

<Actions/Advantages of Communication System of this Embodiment>

As described above, in the communication system of this embodiment, Femto AP 20 acquires the IP address of CS-dedicated PDG 60 from external DNS Server 40, connects to CS-dedicated PDG 60 based on the acquired IP address of CS-dedicated PDG 60, and establishes the first IPSec Tunnel between Femto AP 20 and CS-dedicated PDG 60. Femto AP 20 also acquires the IP address of PS-dedicated PDG 70 from internal DNS Server 50 through the first IPSec Tunnel, connects to PS-dedicated PDG 70 based on the acquired IP address of PS-dedicated PDG 70, and establishes the second IPSec Tunnel between Femto AP 20 and PS-dedicated PDG 70. In this way, Femto AP 20 can establish the first IPSec Tunnel and acquire the IP address of PS-dedicated PDG 70 while security is ensured.

On the other hand, UE 10 acquires the IP address of WWW Server 90 from WAP DNS Server 80 through the second IPSec Tunnel, and connects to WWW Server 90 based on the acquired IP address of WWW Server 90 to utilize services provided by WWW Server 90. In this way, Femto AP 20 can establish the second IPSec Tunnel, and allow UE 10 to utilize services of WWW Server 90 while the security is kept ensured.

Second Embodiment

Figure 5:
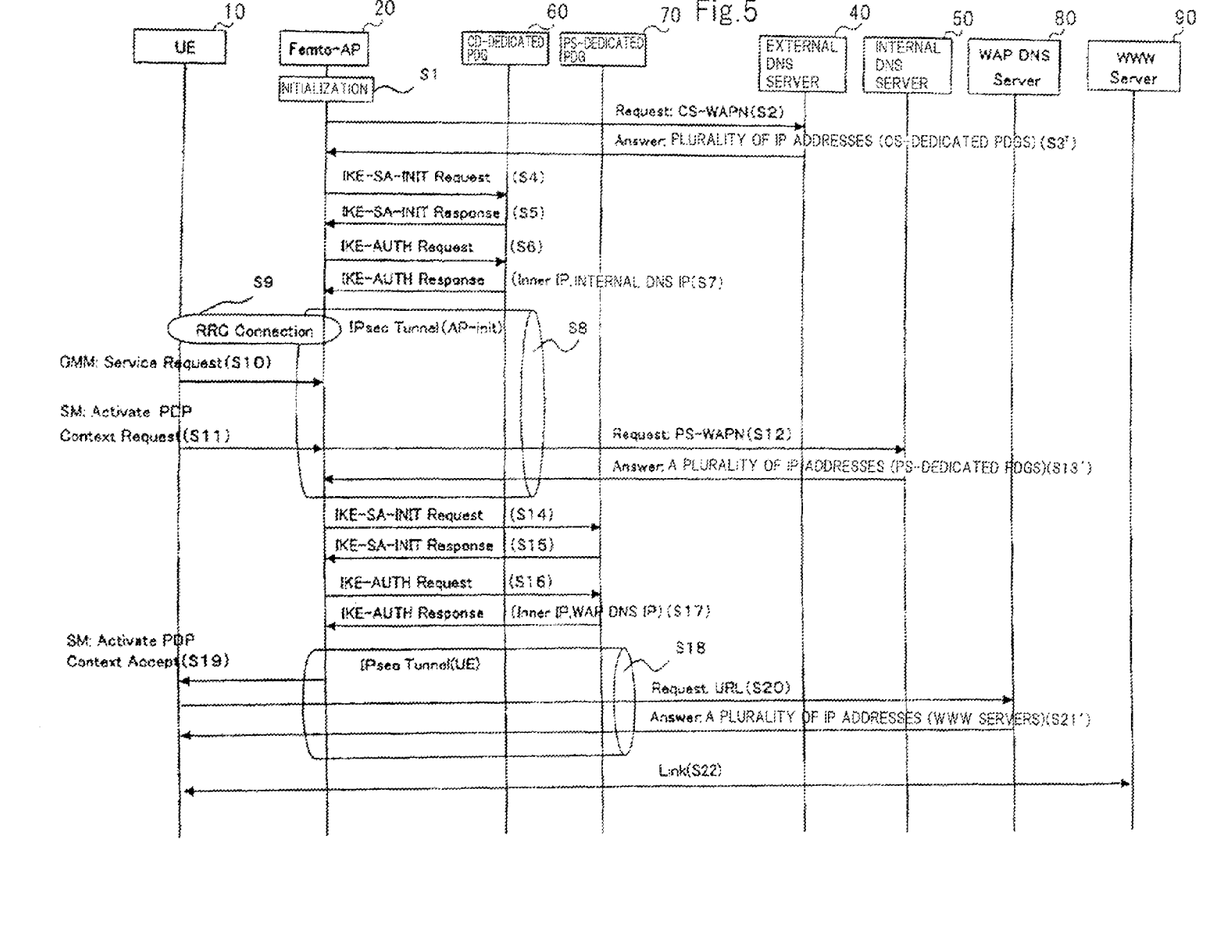
FIG. 5 A diagram for describing a second embodiment of the processing operation of the communication system shown in FIG. 3.

FIG. 5 is a diagram for describing a second embodiment of the processing operations of the communication system shown in FIG. 3.

In the first embodiment, external DNS Server 40, upon receipt of a Request transmitted from Femto AP 20, acquires the IP address of CS-dedicated PDG 60 corresponding to CS-WAPN, and transmits an Answer including the IP address of CS-dedicated PDG 60 to Femto AP 20, as shown in FIG. 4.

On the other hand, internal DNS Server 50, upon receipt of a Request transmitted from Femto AP 20, acquires the IP address of PS-dedicated PDG 70 corresponding to PS-WAPN, and transmits an Answer including the IP address of PS-dedicated PDG 70 to Femto AP 20.

WAP DNS Server 80 in turn acquires the IP address of WWW Server 90 corresponding to the URL, and transmits an Answer including the IP address of this WWW Server 90 to UE 10.

The second embodiment comprises a plurality of CS-dedicated PDGs 60, PS-dedicated PDGs 70, and WWW Servers 90.

Then, external DNS Server 40 acquires IP addresses (list) of a plurality of CS-dedicated PDGs 60 corresponding to CS-WAPN transmitted from Femto AP 20, making use of a round robin function of the DNS server, as shown in FIG. 5, and transmits an Answer including the IP addresses (list) of the plurality of CS-dedicated PDGs 60 to Femto AP 20 (step S3').

Internal DNS Server 50 in turn acquires IP addresses (list) of a plurality of PS-dedicated PDGs 70 corresponding to PS-WAPN transmitted from Femto AP 20, making use of the round robin function of the DNS server, and transmits an Answer including the IP addresses (list) of the plurality of PS-dedicated PDGs 70 to Femto AP 10 (step S13').

WAP DNS Server 80 in turn acquires IP addresses (list) of a plurality of WWW Servers 90 corresponding to the URL transmitted from UE 10, making use of the round robin function of the DNS server, and transmits an Answer including the IP addresses (list) of the plurality of WWW Servers 90 to UE 10 (step S21').

In this way, Femto AP 20 can connect to CS-dedicated PDGs 60 or connect to PS-dedicated PDGs 70 in a round robin fashion based on the plurality of IP addresses (list) acquired from external DNS Server 40 and internal DNS Server 50. Also, UE 10 can connect to WWW Servers 90 in a round robin fashion based on the plurality of IP addresses (list) acquired from WAP DNS Server 80. As a result, the communication system of this embodiment can accomplish a load distribution.

It should be understood that the foregoing embodiments are preferred embodiments of the present invention, the scope of the present invention is not limited to the foregoing embodiments, and a variety of modifications can be made to the embodiments without departing from the spirit of the invention. For example, Non-Patent Document 1 presented in this specification is an example, and the communication system in the embodiment can be practiced without depending on the version of 3GPP described in Non-Patent Document 1.

Also, the control operations in each device which forms part of the communication system in the embodiment described above can be implemented in hardware or software, or using a composite configuration of both.

When processing is executed using software, a program which records a processing sequence can be installed into a memory within and executed by a computer which is incorporated in dedicated hardware. Alternatively, the program may be installed in and executed by a general-purpose computer which is capable of executing a variety of processing. For example, a program can be previously recorded in a hard disk or ROM (Read Only Memory) as a recording medium. Alternatively, a program can be temporarily or permanently stored (recorded) on a removable recording medium. Such a removable recording medium can be provided as so-called package software. For reference, removable recording media include floppy (registered trade mark) disk, CD-ROM (Compact Disc Read Only Memory), MO (Magneto-optical) disk, DVD (Digital Versatile Disc), magnetic disk, semiconductor memory, and the like.

Notably, a program is installed from a removable recording medium as mentioned above into a computer. Alternatively, a program is transferred over the air from a download site to a computer. Further alternatively, a program is transferred to a computer through a network in a wired manner.

Also, the communication system in the embodiment can be constructed not only to execute processing in a time series manner in accordance with the processing operations described in the aforementioned embodiments, but also to parallelly or individually execute processing in accordance with the processing capabilities of devices which execute the processing, or when such processing is required.

The present invention can be applied to services which employ femto-cell base stations.

While the present invention has been described with reference to several embodiments, the present invention is not limited to the embodiments described above. The present invention can be modified in configuration and details in various manners which can be understood by those skilled in the art within the scope of the present invention.

The invention claimed is:

1. A communication system comprising:
   a femto-cell base station for defining a predetermined communication area, a relay device for receiving a message transmitted from said femto-cell base station, and a management device for managing an IP address of said relay device, wherein:
   said relay device comprises a CS (Circuit Switching)—dedicated relay device used for CS services and a PS (Packet Switching)—dedicated relay device used for PS services,
   said management device comprises a first management device for managing an IP address of said CS-dedicated relay device, and a second management device for managing an IP address of said PS-dedicated relay device, and
   said femto-cell base station comprises:
   first establishing means for acquiring the IP address of said CS-dedicated relay device from said first management device, connecting to said CS-dedicated relay device based on the acquired IP address of said CS-dedicated relay device, and establishing a first IPsec Tunnel between said femto-cell base station and said CS-dedicated relay device; and
   second establishing means for acquiring the IP address of said PS-dedicated relay device from said second management device through said first IPsec Tunnel, connecting to said PS-dedicated relay device based on the acquired IP address of said PS-dedicated relay device, and establishing a second IPSec Tunnel between said femto-cell base station and said PS-dedicated relay device.

2. The communication system according to claim 1, wherein:
   said femto-cell base station queries said first management device for the IP address of said CS-dedicated relay device, and acquires the IP address of said CS-dedicated relay device from said first management device.

3. The communication system according to claim 1, wherein:
   said femto-cell base station acquires an IP address of said second management device from said CS-dedicated relay device when the first IPsec Tunnel is established between said femto-cell base station and said CS-dedicated relay device, queries said second management device for the IP address of said PS-dedicated relay device through said first IPsec Tunnel based on the acquired IP address of said second management device, and acquires the IP address of said PS-dedicated relay device from said second management device through said first IPsec Tunnel.

4. The communication system according to claim 3, wherein:
   at least one of said first management device and said second management device provides a plurality of IP addresses to said femto-cell base station upon receipt of a query for IP address from said femto-cell base station,
   when said femto-cell base station acquires IP addresses of a plurality of said CS-dedicated relay devices through the query for IP address, said first establishing means makes connections in a round robin fashion based on the acquired IP addresses of the plurality of said CS-dedicated relay devices, and when said femto-cell base station acquires IP addresses of a plurality of said PS-dedicated relay devices through the query for IP address, said second establishing means makes connections in a round robin fashion based on the acquired IP addresses of the plurality of said PS-dedicated relay devices.

5. The communication system according to claim 1, comprising:
a UE (User Equipment);
a service provision device for providing said UE with a variety of services; and
a third management device for managing an IP address of said service provision device,
wherein said UE acquires the IP address of said service provision device from said third management device through said second IPsec Tunnel, connects to said service provision device based on the acquired IP address of said service provision device, and utilizes a service provided by said service provision device.

6. The communication system according to claim 5, wherein:
said femto-cell base station acquires the IP address of said third management device from said PS-dedicated relay device when the second IPSec Tunnel is established between said femto-cell base station and said PS-dedicated relay device,
said UE queries said third management device for the IP address of said service provision device through said second IPSec Tunnel based on the IP address of said third management device acquired by said femto-cell base station, and acquires the IP address of said service provision device from said third management device through said second IPSec Tunnel.

7. A femto-cell base station for defining a predetermined communication area, comprising:
first establishing means for acquiring an IP address of a CS (Circuit Switching)-dedicated relay device used for CS services from a first management device, connecting to said CS-dedicated relay device based on the acquired IP address of said CS-dedicated relay device, and establishing a first IPSec Tunnel between said femto-cell base station and said CS-dedicated relay device; and
second establishing means for acquiring an IP address of a PS (Packet Switching)-dedicated relay device used for PS services from a second management device through said first IPSec tunnel, connecting to said PS-dedicated relay device based on the acquired IP address of said PS-dedicated relay device, and establishing a second IPSec Tunnel between said femto-cell base station and said PS-dedicated relay device.

8. The femto-cell base station according to claim 7, wherein:
said first establishing means acquires an IP address of said second management device from said CS-dedicated relay device when the first IPSec Tunnel is established between said femto-cell base station and said CS-dedicated relay device, and
said second establishing means queries said second management device for the IP address of said PS-dedicated relay device through said first IPSec Tunnel based on the IP address of said second management device acquired by said first establishing means from said CS-dedicated relay device, and acquires the IP address of said PS-dedicated relay device from said second management device through said first IPSec Tunnel.

9. A communication method comprising:
a femto-cell base station defining a predetermined communication area;
a relay device receiving a message transmitted from said femto-cell base station, said relay device comprising a CS (Circuit Switching)-dedicated relay device used for CS services and a PS (Packet Switching)-dedicated relay device used for PS services;
a first management device managing an IP address of said CS-dedicated relay device;
second management device managing an IP address of said PS-dedicated relay device;
said communication method further comprising:
a first establishing step of said femto-cell base station acquiring the IP address of said CS-dedicated relay device from said first management device, connecting to said CS-dedicated relay device based on the acquired IP address of said CS-dedicated relay device, and establishing a first IPsec Tunnel between said femto-cell base station and said CS-dedicated relay device; and
a second establishing step of said femto-cell acquiring the IP address of said PS-dedicated relay device from said second management device through said first IPsec Tunnel, connecting to said PS-dedicated relay device based on the acquired IP address of said PS-dedicated relay device, and establishing a second IPSec Tunnel between said femto-cell base station and said PS-dedicated relay device.

10. The communication method according to claim 9, wherein:
said first establishing step acquires an IP address of said second management device from said CS-dedicated relay device when the first IPsec Tunnel is established between said femto-cell base station and said CS-dedicated relay device, and
said second establishing step queries said second management device for the IP address of said PS-dedicated relay device through said first IPsec Tunnel based on the IP address of said second management device acquired from said CS-dedicated relay device by said first establishing step, and acquires the IP address of said PS-dedicated relay device from said second management device through said first IPsec Tunnel.

11. A communication method performed by a femto-cell base station for defining a predetermined communication area, said communication method comprising:
a first establishing step of acquiring an IP address of a CS (Circuit Switching) dedicated relay device used for CS services from a first management device, connecting to said CS-dedicated relay device based on the acquired IP address of said CS-dedicated relay device, and establishing a first IPSec Tunnel between said femto-cell base station and said CS-dedicated relay device; and
a second establishing step of acquiring an IP address of a PS (Packet Switching) dedicated relay device used for PS services from a second management device through said first IPSec Tunnel, connecting to said PS-dedicated relay device based on the acquired IP address of said PS-dedicated relay device, and establishing a second IPSec Tunnel between said femto-cell base station and said PS-dedicated relay device.

12. The communication method according to claim 11, wherein:
said first establishing step acquires an IP address of said second management device from said CS-dedicated relay device when the first IPSec Tunnel is established between said femto-cell base station and said CS-dedicated relay device, and said second establishing step queries said second management device for the IP address of said PS-dedicated relay device through said first IPSec Tunnel based on the IP address of said second management device acquired by said first establishing means from said aid CS-dedicated relay device, and acquires the IP address of said PS-dedicated relay device from said second management device through said first IPSec Tunnel.

13. A non-transitory recording medium having recorded thereon a communication program for execution by a femto-cell base station for defining a predetermined communication area, said communication program causing said femto-cell base station to execute a method comprising:

a first establishing procedure for acquiring an IP address of a CS (Circuit Switching) dedicated relay device used for CS services from a first management device, connecting to said CS-dedicated relay device based on the acquired IP address of said CS-dedicated relay device, and establishing a first IPSec Tunnel between said femto-cell base station and said CS-dedicated relay device; and a second establishing procedure for acquiring an IP address of a PS (Packet Switching) dedicated relay device used for PS services from a second management device through said first IPSec Tunnel, connecting to said PS-dedicated relay device based on the acquired IP address of said PS-dedicated relay device, and establishing a second IPSec Tunnel between said femto-cell base station and said PS-dedicated relay device.

14. The non-transitory recording medium according to claim 13, wherein:

said first establishing procedure acquires an IP address of said second management device from said CS-dedicated relay device when the first IPSec Tunnel is established between said femto-cell base station and said CS-dedicated relay device, and said second establishing procedure queries said second management device for the IP address of said PS-dedicated relay device through said first IPSec Tunnel based on the IP address of said second management device acquired by said first establishing means from said CS-dedicated relay device, and acquires the IP address of said PS-dedicated relay device from said second management device through said first IPSec Tunnel.

* * * * *